US011911955B1

(12) United States Patent
Cluff et al.

(10) Patent No.: US 11,911,955 B1
(45) Date of Patent: Feb. 27, 2024

(54) SYSTEM AND METHOD EMBODIMENTS FOR MODIFYING GAS CONTENT IN PRINTABLE COMPOSITIONS FOR ADDITIVE MANUFACTURING

(71) Applicant: Triad National Security, LLC, Los Alamos, NM (US)

(72) Inventors: Kyle Cluff, Los Alamos, NM (US); Matthew Lee, Los Alamos, NM (US); Nicholas Parra-Vasquez, Los Alamos, NM (US); Matthew Crall, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 622 days.

(21) Appl. No.: 17/111,431

(22) Filed: Dec. 3, 2020

Related U.S. Application Data

(60) Provisional application No. 62/943,091, filed on Dec. 3, 2019.

(51) Int. Cl.
*B29C 64/255* (2017.01)
*B29C 64/124* (2017.01)
*B29C 64/232* (2017.01)
*B29C 64/245* (2017.01)
*B29C 64/264* (2017.01)
*B29C 64/343* (2017.01)
(Continued)

(52) U.S. Cl.
CPC .......... *B29C 64/124* (2017.08); *B29C 64/232* (2017.08); *B29C 64/245* (2017.08); *B29C 64/255* (2017.08); *B29C 64/264* (2017.08); *B29C 64/343* (2017.08); *B29C 64/371* (2017.08); *B33Y 10/00* (2014.12); *B33Y 30/00* (2014.12)

(58) Field of Classification Search
CPC .................................................. B29C 64/255
See application file for complete search history.

(56) References Cited

U.S. PATENT DOCUMENTS

| 5,236,637 A | * | 8/1993 | Hull | ....................... B33Y 30/00 118/712 |
| 10,232,552 B2 | * | 3/2019 | Baltaji | ................. C09D 175/04 |

(Continued)

OTHER PUBLICATIONS

Walker et al., "Rapid, large-volume thermally controlled 3D printing using a mobile liquid interface," *Science*, 366:360-364 (Oct. 18, 2019).

(Continued)

*Primary Examiner* — Timothy Kennedy
(74) *Attorney, Agent, or Firm* — Klarquist Sparkman, LLP

(57) ABSTRACT

Disclosed herein are embodiments of a system for use in additive manufacturing methods. The system can comprise a first container, and a first fluid and a second fluid forming a fluid-fluid interface within the first container. The first fluid is between the fluid-fluid interface and the transparent portion of the first container and configured to remove oxygen from the second fluid at the fluid-fluid interface to facilitate polymerization of a monomeric component in the second fluid. The system can also comprise a circulation system configured to circulate the first fluid through the first container such that the first fluid flows between the fluid-fluid interface and the inner surface of the transparent portion of the first container.

18 Claims, 6 Drawing Sheets

(51) Int. Cl.
*B29C 64/371* (2017.01)
*B33Y 10/00* (2015.01)
*B33Y 30/00* (2015.01)

(56) References Cited

U.S. PATENT DOCUMENTS

| | | | |
|---|---|---|---|
| 10,933,580 B2* | 3/2021 | Truong | B29C 64/277 |
| 11,312,074 B2* | 4/2022 | Damiano | B29C 64/255 |
| 2010/0310698 A1* | 12/2010 | Klare | B33Y 30/00 |
| | | | 425/174.4 |
| 2013/0292862 A1* | 11/2013 | Joyce | B29C 64/35 |
| | | | 425/135 |
| 2013/0295212 A1* | 11/2013 | Chen | B33Y 10/00 |
| | | | 425/150 |
| 2016/0059484 A1* | 3/2016 | DeSimone | B29C 64/40 |
| | | | 264/401 |
| 2017/0028618 A1* | 2/2017 | Robeson | B33Y 10/00 |
| 2019/0160733 A1 | 5/2019 | Mirkin et al. | |

OTHER PUBLICATIONS

Morris, "Highest-throughput 3D printer is future of manufacturing: Rapid manufacturing on-demand could put warehouses, molds into the past," Northwestern Now, available at: https://news.northwestern.edu/stories/2019/10/biggest-fastest-3d-printer-is-future-of-manufacturing/, 7 pages, retrieved Mar. 12, 2021.

* cited by examiner

SYSTEM AND METHOD EMBODIMENTS FOR MODIFYING GAS CONTENT IN PRINTABLE COMPOSITIONS FOR ADDITIVE MANUFACTURING

CROSS REFERENCE TO RELATED APPLICATION

This application claims the benefit of U.S. Provisional Application No. 62/943,091, filed Dec. 3, 2019, which is hereby incorporated by reference in its entirety.

ACKNOWLEDGMENT OF GOVERNMENT SUPPORT

The invention was made by an agency of the United States Government or under a contract with an agency of the United States Government. The name of the U.S. Government agency and the Government contract number are: 89233218CNA000001 awarded by the U.S. Department of Energy/National Nuclear Security Administration.

FIELD

The present disclosure is directed to embodiments of a system and method for modifying gas content in printable compositions used in additive manufacturing methods.

BACKGROUND

Conventional additive manufacturing processes, such as digital light processing (DLP), stereolithography (SLA), and the like, generally print an object in an inverted and layer-by-layer fashion within a vat of photopolymer resin. This inverted processing both reduces the volume of resin necessary and achieves higher resolution. However, these conventional processes largely result in the final object being adhered to the processing surface, which is often the bottom surface of the vat. This adhesion between the object and the bottom of the vat typically requires the slow and time-consuming process of detaching layers of the adhered material, which can decrease efficiency and increase costs by necessitating regular replacement of expensive vats.

Although there are processes seeking to remedy surface adhesion by way of altering the composition of the contained liquid(s) and/or the vat surfaces, these processes fail to address preexisting problems and magnify their negative effects. For example, during these processes, elevated levels of undesirable gases, such as oxygen, can be present and/or increase within the vat and at the processing surface. The significant presence of such gases relative to the size of the processing surface has a negative effect on the processing speed and resolution on the printed object because polymerization across the individual layers is inconsistent, which also results in the compromised mechanical and structural integrity of the printed object. Thus, a need exists in the art for a system and method for improving processing time and resolution by addressing both surface adhesion and elevated levels of unwanted gases, without having to sacrifice the physical properties of the printed objects.

SUMMARY

Disclosed herein are embodiments of a system for modifying gas content in printable compositions used in additive manufacturing methods. In some embodiments, the system comprises a unique fluid-fluid interface and gas transport system that facilitates additive manufacturing processes. In particular embodiments, the system comprises a first container comprising two different fluids, such as a first fluid and a second fluid, that form a fluid-fluid interface upon which a polymerized object may be printed. In other particular embodiments, the system comprises components that facilitate modifying the concentration of any undesirable gases present in the first and/or second fluids.

In some embodiments, the system comprises an additional container having an inlet region and an outlet region; the first container having an inlet region, an outlet region, and a transparent portion with an inner surface and an outer surface. In some embodiments, the system can further comprise a first conduit for conveying fluid which is formed by a first tube fluidly coupled to the outlet region of the second container and the inlet region of the first container. The system can also comprise a second conduit for conveying fluid which is formed by a second tube fluidly coupled to the outlet region of the first container and the inlet region of the second container.

In further embodiments, the system can comprise a first fluid and a second fluid forming a fluid-fluid interface within the first container extending from a first side to a second side of the first container, wherein the first fluid is treated with an inert gas and is in contact with the inner surface of the transparent portion of the first container. In further embodiments, the system comprises a pumping mechanism configured to circulate the first fluid through the second container, the first conduit, the first container, and the second conduit, such that the first fluid flows between the fluid-fluid interface and the inner surface of the transparent portion of the first container, and from the inlet region of the first container to the outlet region of the first container.

Also disclosed herein are embodiments of a method comprising treating the first fluid in the second container with the inert gas to form an inert gas-treated fluid and feeding the inert gas-treated fluid from the second container to the inlet region of the first container. In particular embodiments, the method comprises controlling a first flow rate of the inert gas-treated fluid as it flows into the inlet region of the first container, wherein the inert gas-treated fluid flows from the inlet region to the outlet region of the first container and between the inner surface of the first container and the fluid-fluid interface. Some embodiments of the method can comprise controlling a second flow rate of the first fluid as it flows from the outlet region of the first container and projecting energy from the energy source on the fluid-fluid interface.

The foregoing and other objects and features of the present disclosure will become more apparent from the following detailed description, which proceeds with references to the accompanying figures.

DETAILED DESCRIPTION

Overview of Terms

Figure 1:
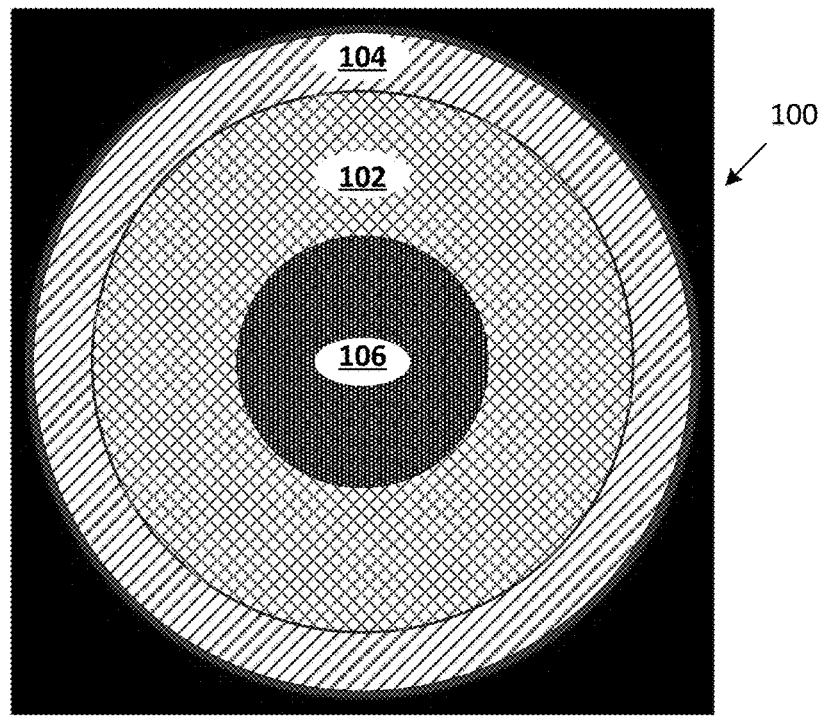
FIG. 1 shows a two-dimensional slice of a lattice template for additive manufacturing, wherein different regions of the lattice template that experience variable polymerization due to oxygen diffusion are illustrated.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise. Additionally, the term "includes" and "has" have the same meaning as "comprises." Further, the term "coupled" does not exclude the presences of intermediate elements between the coupled items.

Although the steps of some of the disclosed methods are described in a particular sequential order for convenient presentation, it should be understood this manner of description encompasses rearrangement, unless a particular ordering is required by specific language set forth below. For example, steps described sequentially may in some cases be rearranged or performed concurrently. Additionally, the description sometimes uses terms like "produce" and "provide" to describe the disclosed methods. These terms are high-level abstractions of the actual steps that are performed. The actual steps that correspond to these terms will vary depending on the particular implementation and are readily discernible by one of ordinary skill in the art. Unless explained otherwise, all technical and scientific terms used herein have the same meaning as commonly understood to one of ordinary skill in the art. The compounds, methods, and examples are illustrative only and not intended to be limiting, unless otherwise indicated. Other features of the disclosure are apparent from the following detailed description and the claims.

The system and method embodiments described herein should not be construed as limiting in any way. Instead, the present disclosure is directed toward all novel and non-obvious features and aspects of the various disclosed embodiments, alone and in various combinations and sub-combinations with one another. The disclosed apparatus is not limited to any specific aspect or feature or combinations thereof, nor does the disclosed apparatus require that any one or more specific advantages be present, or problems be solved. Any theories of operation are to facilitate explanation, but the disclosed apparatus is not limited to such theories.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximate unless the word "about" is recited. Furthermore, not all alternatives recited herein are equivalents.

To facilitate review of the various embodiments of the disclosure, the following explanations of specific terms and abbreviations are provided:

Chlorinated Solvent: A chemical compound, typically in a liquid state, that comprises at least one chlorine (Cl) atom.

Energy Source: A source that delivers photons, ions, electrons, heat, or other suitable energy sufficient for inducing polymerization. In some embodiments, the energy source may be configured to project and/or have differing wavelengths, pathways, and/or images, both two- and three-dimensional.

Fluid: A substance that has no fixed shape and yields easily to external pressure. In particular disclosed embodiments, a first fluid and/or a second fluid of the present disclosure can be a liquid, such as a viscous or non-viscous liquid. In embodiments wherein the first fluid and/or the second fluid further comprises one or more additive components, the additive components themselves may have a different state than the first and/or second fluids (e.g., a solid), but the overall state of the mixture is fluid (that is, the first fluid and/or the second fluid can be fluids in which solids are dispersed and still referred to as a fluid).

Fluid-Fluid Interface: An interfacial region formed between a first fluid and a second fluid and, typically, having properties different from the first and the second fluids.

Initiator: A compound that is capable of initiating or promoting the formation of one or more radical species and/or ionic species from a monomeric component.

Liquid: A state of matter with a definite volume but no fixed shape. In embodiments wherein the first fluid and/or the second fluid are liquids and comprise one or more additive components, the additive components themselves may have a different state than the first and/or second fluids (e.g., a solid), but the overall state of the mixture is liquid (that is, the first fluid and/or the second fluid can be liquids in which solids are dispersed and still referred to as a liquid).

Modifying: This term as used herein can refer to the reduction, displacement, depletion, and/or replacement of a gas within a printable resin.

Monomeric Component: A single monomer species, or an oligomer species (comprising one or more monomer species that are the same or different), or any combination thereof, that provides a polymerizable unit that can be polymerized during an additive manufacturing method, such as a photo-polymerization method. Solely by way of example, polyethylene glycol diacrylate is a representative monomeric component that comprises an oligomer of ethylene glycol units that can be polymerized to provide a polyethylene glycol polymer.

Perfluorinated Solvent: A solvent, typically an organic solvent, comprising at least one C—F bond (typically wherein the C—F bond has replaced at least one C—H bond). In some embodiments, a perfluorinated solvent can comprise carbon-carbon bonds, C—F bonds, and one or more heteroatoms (e.g., O, N, S, Br, Cl, I or P) or heteroatom-containing functional groups (OH, $CO_2H$, $SO_3H$ or the like).

Polymerization Quenching Compound: A compound that is capable of preventing or altering any undesired polymerization of a monomeric component present in a first fluid and/or second fluid (or that makes up the first fluid and/or second fluid). In some embodiments, the polymerization quenching compound (i) prevents polymerization from extending beyond a treatment pattern used to print an object, such as by preventing radical formation in regions not within the treatment pattern, (ii) prevents polymerization from increasing the thickness of printed layers of the printable composition beyond a desired thickness (e.g., thickness above the height of a printing plane along the z-axis), and/or (iii) scavenges radicals to thereby terminate polymerization. In some embodiments, the polymerization quenching compound can be a radical scavenger or an absorber compound.

Printable Resin/Photopolymer: A composition comprising at least one monomeric component capable of being polymerized during an additive manufacturing process. In some embodiments, the printable resin can consist essentially of or consist of the monomeric component. In additional embodiments, the printable resin can comprise the monomeric component and one or more additive components, such as an initiator, a polymerization quenching compound, a solvent or any combination thereof.

Pump: Any device that moves fluids, gases, slurries, and/or liquids by mechanical action. In some embodiments, a pump can include, but is not limited to, a device classified as a displacement pump, a direct lift pump, a gravity pump, and/or a combination thereof.

Substantially Hydrophobic: This term refers to a property of a second fluid used in combination with a first fluid that is water or contains water. In such embodiments, the second fluid is sufficiently hydrophobic so as not to mix with the first fluid to an extent that prevents formation of the fluid-fluid interface.

Substantially Hydrophilic: This term refers to a property of a second fluid used in combination with a first fluid that is an organic solvent, such as a chlorinated or perfluorinated solvent. In such embodiments, the second fluid is sufficiently hydrophilic so as not to mix with the second fluid to an extent that prevents formation of the fluid-fluid interface.

Tubing: This term refers to any structure comprising a hollowed body and/or a lumen for conveying fluids, such as gases, slurries, and/or liquids. In some embodiments, tubing may be made of glass, plastic, metals, polymers, and/or any combination thereof.

Viscosity Enhancer: As compound that increases the viscosity of a fluid as compared to its viscosity without the additive material.

Introduction

Various issues arise from the adhesion between the surfaces of a printed object and the bottom of the vat during additive manufacturing processes. For example, adhesion often causes damage to the vat container, requiring the user to replace an already particularly expensive component. Adhesion can also impose additional limitations on the process of manufacturing itself, such as limiting the number of suitable resins and/or by increasing process times by way of additional exposure times and the process of detaching the final object, assuming the object is not already damaged.

Attempts to circumvent these problems are focused on redesigning the vat with a permeable surface, altering the chemical composition of the resin, and/or including additional liquid formulations. These attempts, however, fail to adequately address the unwanted gas diffusion at the processing surface resulting from the already present and/or increased levels of oxygen within the printable resin. The resulting gas diffusion can have a substantial deleterious effect on the quality of the final object, including inconsistent polymerization across individual layers of the object, which can lead to considerably low resolution. For example, photoinitiators within most photopolymer resins generate free radicals to induce polymerization; however, the presence of oxygen uses up these radicals much more quickly than the radicals can induce polymerization. When printing objects, particularly at smaller scales, the rate at which oxygen diffuses from the surrounding resin is greater than or equal to the rate at which radicals induce polymerization, which can cause poor polymerization across the layers of the printed object, resulting in loss of resolution and/or structural integrity.

Figure 2:
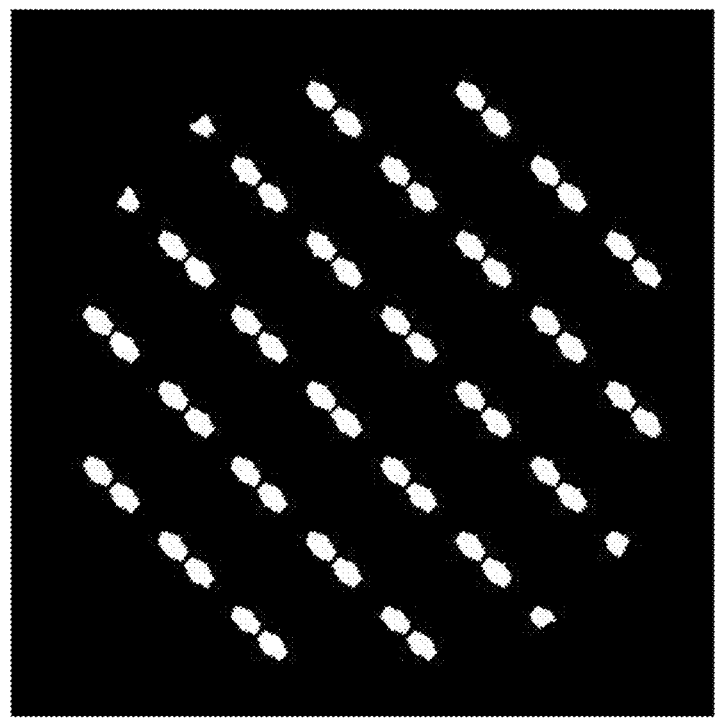
FIG. 2 is a two-dimensional slice of a lattice template for additive manufacturing, which comprises a lattice pattern.
Figure 4:
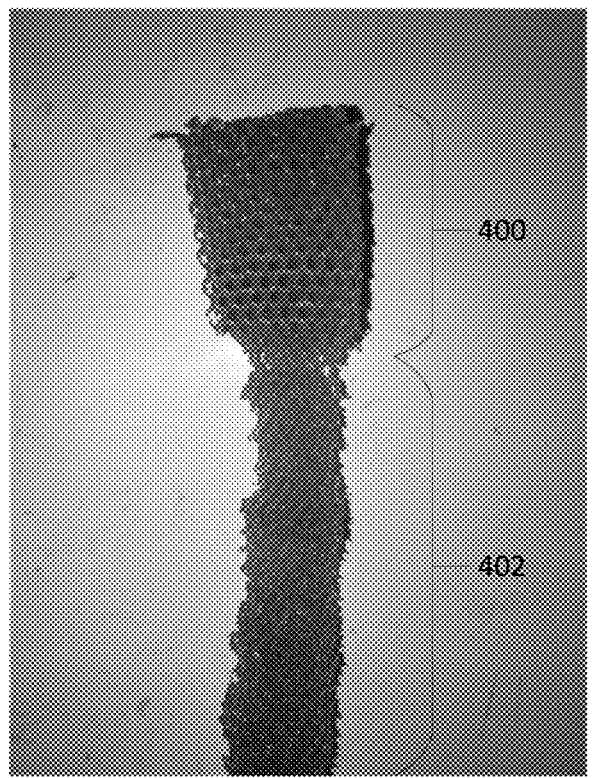
FIG. 4 is a view of a printed lattice structure made using an additive manufacturing method, wherein a portion of the printed structure (region 400) was printed according to a system and method embodiment of the present disclosure and a portion of the printed structure was printed in the presence of oxygen (region 402) and thus resulted in deterioration of the desired lattice structure seen in region 400.

FIGS. 1 and 4 provide images showing how gas diffusion during an additive manufacturing process can result in loss of structural integrity and/or undesirable variation in polymerization. FIG. 1 illustrates the effect of oxygen diffusion across a two-dimensional slice of a lattice template (e.g., lattice template 100) after (or during) polymerization. With reference to FIG. 1, middle portion 102 of lattice template 100 will experience close to optimal polymerization while outer edge 104 likely will not polymerize at all due to the rapid rate of diffusion along the outer edges. And, central portion 106 of the layer will print as a solid polymer lacking the desired lattice structure due to excessive polymerization. While not illustrated in FIG. 1, the lattice template can have a lattice pattern as illustrated in FIG. 2.

The system and method embodiments of the present disclosure are able to address at least the deficiencies noted above. For example, system embodiments and methods of using such systems discussed herein eliminate any adhesion between the object and the bottom of the vat (or container, e.g., a first container) while concurrently modifying the levels of unwanted oxygen within the resin. These characteristics greatly expand the range of materials that can be printed, improves print times and resolution (particularly at a smaller scale), and enhances the structural integrity of the final object. The system can be used under atmospheric conditions and facilitates continuous printing as the printing platform moves. In some embodiments, the system can be used to print true "monolithic" parts without any layers subject to delamination and inconsistent polymerization, which are common problems with 3-D printed objects built in a "layer-by-layer" fashion.

Solely by way of example, ethoxylated trimethylolpropane triacrylate (TMPTA) resin is desirable for additive manufacturing; however, it can be especially difficult to print parts in the presence of oxygen, particularly smaller and more intricate parts. When employing a conventional vat and printing process without the disclosed novel fluid-fluid interface and system embodiments, layers of the part will not undergo full polymerization and/or can become detached or ripped, which results in catastrophic failure of the print. Using a fluid-fluid interface and system embodiments as described herein, parts can be formed from printable resins, including an ethoxylated TMPTA resin or other resins disclosed herein, even at high concentrations (e.g., 25%-100%).

Figure 3:
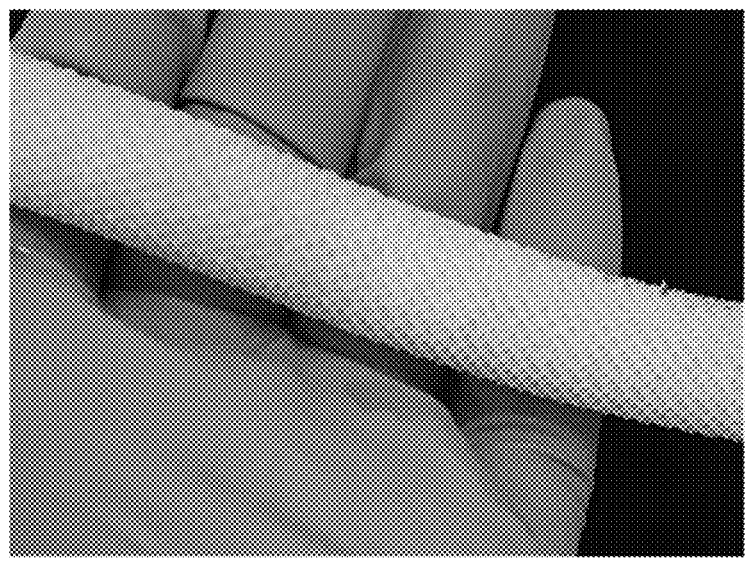
FIG. 3 is a view of a printed lattice structure made using an additive manufacturing method of the present disclosure, wherein the method was carried out using a representative system embodiment of the present disclosure.

Solely for illustrative purposes, FIGS. 3 and 4 are provided and show a fine lattice structure printed with a system and method of the present disclosure (see FIG. 3) and a lattice structure lacking structural integrity and lattice definition throughout the printed object (see FIG. 4). FIG. 3 shows the high resolution achieved from printing at the fluid-fluid interface in the presence of modified levels of oxygen. In contrast, FIG. 4 shows the deleterious effects that undesirable levels of oxygen can have on printed parts. With reference to FIG. 4, region 400 of the printed object was obtained using a system and method embodiment of the present disclosure to modify excess oxygen, whereas region 402 was printed without circulating an inert gas-treated solvent through the system as described herein.

System Embodiments

Disclosed herein are embodiments of a system for use in additive manufacturing processes, such as processes involving polymerization printing techniques (e.g., DLP, CDLP, and/or SLA processes). In some embodiments, the system comprises a first container having an inlet region, an outlet region, and a transparent portion with an inner surface and an outer surface; a second container having an inlet region and an outlet region; a first conduit for conveying fluid formed by a first tube fluidly coupled to the outlet region of the second container and the inlet region of the first container; a second conduit for conveying fluid formed by a second tube fluidly coupled to the outlet region of the first container and the inlet region of the second container; a first fluid and a second fluid forming a fluid-fluid interface within the first container extending from a first side to a second side of the first container, wherein the first fluid is treated with an inert gas and is in contact with the inner surface of the transparent portion of the first container; and a pumping mechanism configured to circulate the first fluid through the second container, the first conduit, the first container, and the second conduit, such that the first fluid flows between the fluid-fluid interface and the inner surface of the transparent portion of the first container, and from the inlet region of the first container to the outlet region of the first container.

In additional embodiments, the system can comprise a first container having a transparent portion with an inner surface and an outer surface; a second container having a volume; and a first fluid and a second fluid forming a fluid-fluid interface within the first container, wherein the volume of the second container houses an inert gas and the first container such that the second container forms an inert gas atmosphere surrounding the first container housing the fluid-fluid interface. In such embodiments, the system can be used in conjunction with (or without) the additional features of the embodiments described herein.

Additional components of the system are described in more detail herein. In some embodiments, the system can be combined with additional components, such as an actuator, a printing platform, an energy source capable of inducing polymerization of at least one fluid of the system, and other components suitable for additive manufacturing methods. In some embodiments, a plurality of any such components can be included.

Figure 5:
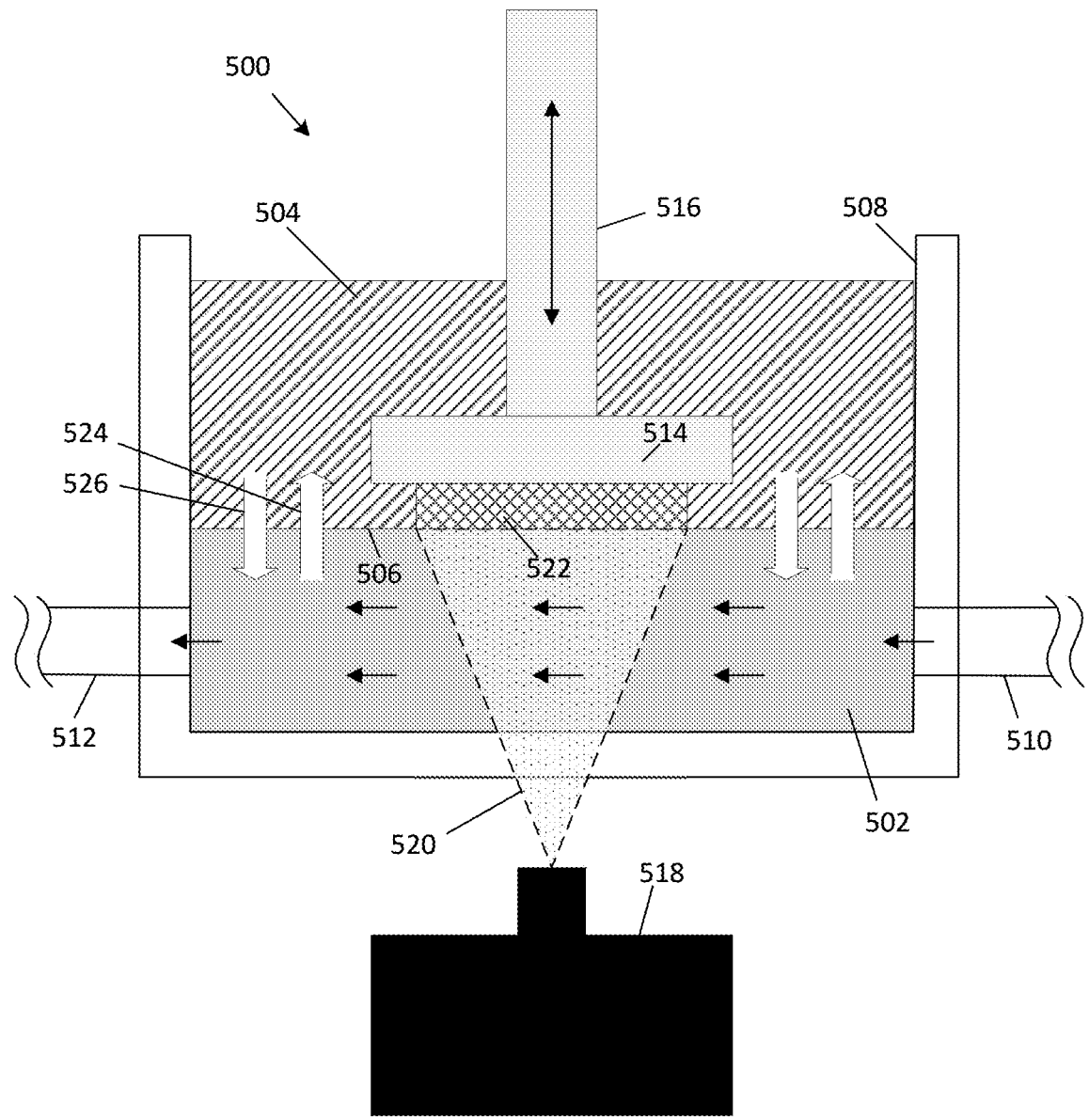
FIG. 5 is a schematic illustration of a system embodiment according to the present disclosure.

A representative system embodiment (system 500) is schematically illustrated in FIG. 5. System 500 can comprise first fluid 502 and second fluid 504, which form fluid-fluid interface 506 within first container 508. System 500 also comprises first and second conduits, 510 and 512, respectively, which are fluidly coupled to first container 508, and additional components that can be used with the system, such as printing platform 514, actuator 516, and energy source 518. As energy source 518 projects energy 520 on fluid-fluid interface 506, second fluid 504 polymerizes at and/or near fluid-fluid interface 506 to form polymerized object 522. Polymerized object 522 is physically associated with printing platform 514, which is coupled to an actuator 516 configured to orient printing platform 514 in second fluid 504. First fluid 502 can be treated with an inert gas 524 and circulated through first container 508, by way of first and second conduits 510, 512, to displace oxygen 526 within second fluid 504 with inert gas 524.

As described above, system embodiments of the present disclosure can comprise a fluid-fluid interface that facilitates printing and polymerizing multiple layers of a resin material (or continuously printing such material) without printed layers (or other portion of the polymerized product) coming into contact with a surface of the first container housing the resin material. In particular embodiments, the system comprises a combination of two or more different fluids that form the fluid-fluid interface, such as a first fluid and a second fluid.

In particular embodiments, a second fluid of the system comprises a printable composition, such as a printable resin material, that is capable of being polymerized to form the printed component during use of the system. The resin material typically comprises at least one monomeric component that can be polymerized to form a polymer; however, the resin material can comprise further compositional constituents in addition to the monomeric component, such as additive components (e.g., an initiator, a polymerization quenching compound, a viscosity enhancer, a solvent, or the like). The monomeric component often can be solubilized or dispersed in a liquid solvent or can, itself, be a liquid substance. Additional compositional constituents of the resin material can be liquids, solids, gases, gels, or combinations thereof.

In some embodiments, the second fluid is a photo-curable composition, such as a photo-curable printable resin. The photo-curable printable resin can be liquid in form, but can comprise one or more solid, gaseous, and/or gel-like components. In some embodiments, the second fluid is any photo-curable composition that can be used in a DLP, CDLP, and/or SLA printing process. Representative examples of the second fluid include, but are not limited to, hydrophobic printable resins (or substantially hydrophobic printable resins), hydrophilic printable resins (or substantially hydrophilic printable resins), including printable resins described in the Examples section of the present disclosure and also including the printable resins described in Bagheri and Jin, "Photopolymerization in 3D Printing," *ACS Appl. Polym. Mater.*, 2019, and/or Decker, "Recent developments in photoinitiated radical polymerization," *Macromol. Symp.*, 143: 45-63, 1999; the disclosed printable resins included in these documents are incorporated herein by reference.

The first fluid of the system is a fluid that has properties sufficient to prevent it from substantially mixing with the second fluid in a manner that allows the second fluid to adhere to a printing surface of the first container component of the system during the printing process. By preventing substantial mixing between the first and second fluid, the second fluid does not become adhered to a printing surface of the first container during printing and thus avoids the need to detach printed layers of the resin material from the printing surface of the first container. In some embodiments, the properties sufficient to prevent mixing with the second fluid can include density and/or solubility. In particular disclosed embodiments, the first fluid also is substantially transparent such that light from an energy source used to facilitate printing is able to reach the second fluid so that it can facilitate polymerization of the second fluid (or a monomeric component present therein). In particular disclosed embodiments, the second fluid is not identical to the first fluid. In an independent embodiment, the first fluid does not comprise a monomeric component and/or the first fluid does not comprise the same monomeric component present in (or making up) the second fluid.

In some embodiments, the first fluid has a density different from that of the second fluid. For example, the first fluid can be denser than the second fluid such that the first fluid contacts a surface of the first container component of the system through which light from an energy source passes through (e.g., a surface of the bottom of the first container) and the second fluid floats above the first fluid and the fluid-fluid interface. In other embodiments, the first fluid can be less dense than the second fluid such that the first fluid floats above the second fluid and wherein the second fluid contacts a surface of the bottom of the first container. In such embodiments, printing occurs at the fluid-fluid interface rather than directly on a surface of the first container.

In some embodiments, the first fluid has a density that is greater than 0 g/mL higher than the density of the second fluid, such as 0.01 g/mL to 2 g/mL higher, or 0.02 g/mL to 1.75 g/mL higher, or 0.05 g/mL to 1.5 g/mL higher, or 0.1 g/mL to 1 g/mL higher than the density of the second fluid. In some embodiments, the first fluid has a density that is less than the density of the second fluid, such as 0.01 g/mL to 2 g/mL less, or 0.02 g/mL to 1.75 g/mL less, or 0.05 g/mL to 1.5 g/mL less, or 0.1 g/mL to 1 g/mL less than the density of the second fluid. Methods of determining the density of the first and second fluid are known to those of ordinary skill in the art with the benefit of the present disclosure.

In additional embodiments, the first fluid is immiscible or is only minimally soluble in the second fluid. In some such embodiments, the first fluid is not sufficiently soluble in the second fluid such the second fluid is able to contact a surface of the first container component (such as a surface of the bottom of the first container). In yet additional embodiments, such as when the first fluid is less dense than the second fluid, the two fluids are not miscible to the extent that the first fluid is allowed to contact a surface of the bottom of the first container. In particular embodiments, the first fluid is sufficiently minimally soluble in the second fluid such that the first fluid is able to physically separate the second fluid from a printing surface of the first container component during the printing process and/or to retain the fluid-fluid interface formed between the two fluids. In particular embodiments where the second fluid comprises non-liquid additive components, the first fluid typically is substantially minimally soluble in a portion of the second fluid that comprises the monomeric component. In such embodiments, the first fluid is able to physically separate the monomeric component from a printing surface of the first container so that the monomeric component does not adhere to the printing surface of the first container during the polymerization process.

Representative examples of the first fluid can include, but are not limited to, organic solvents, aqueous solutions (e.g., water or water-based solutions), or combinations thereof. Suitable organic solvents include, but are not limited to, chlorinated solvents (e.g., chloroform, dichloromethane, carbon tetrachloride, chlorobenzene, 1,2-dichloroethane, and the like), perfluorinated liquids/solvents (e.g., perfluorohexane, perfluoro(2-butyl-tetrahydrofurane), perfluoropentylamine, perfluorotributylamine, and other perfluorinated solvents), ionic liquids, silicone oils, or combinations thereof. In particular disclosed embodiments, a perfluorinated liquid, such as those sold under the tradename FLUORINERT®, by 3M, can be used, including, but not limited to, perfluorinated liquids like FC-3284 (having an average molecular weight of 299 g/mol), FC-72 (having an average molecular weight of 338 g/mol), FC-770 (having an average molecular weight of 399 g/mol), FC-3283 (having an average molecular weight of 521 g/mol), FC-40 (having an average molecular weight of 650 g/mol), FC-43 (having an average molecular weight of 670 g/mol), FC-70 (having an average molecular weight of 820 g/mol), or combinations thereof.

In additional embodiments, such as when the first fluid is less dense than the second fluid, the first fluid can be an organic solvent having a density less than the second fluid. Representative organic solvents in such embodiments can include, but are not limited to, benzene, toluene, tetrahydrofuran, dimethylformamide, acetonitrile, water, methanol, ethanol, ionic liquids, silicone oils, aliphatic solvents (e.g., solvents comprising linear and/or cycloalkanes), and the like.

In further embodiments, the first fluid can have low viscosity. The first fluid can have a viscosity lower than that of, for example, perfluorinated oils such as those Krytox™ or Fomblin® oils as to facilitate movement of the first fluid. Alternatively, in some embodiments, additive components can be included in the first fluid. Additive materials can include components that increase viscosity of the first fluid (or a second fluid) as compared to its viscosity without the additive material (referred to herein as a viscosity enhancer). In particular embodiments, viscosity enhancers are included in the first fluid. Exemplary viscosity enhancers can include, but are not limited to, polymeric compounds (e.g., polytetrafluoroethene or other fluorinated polymers, ethylene/propylene copolymers, ethylene/propylene-diene copolymers, ethylene/propylene-acrylate copolymers, ethylene/propylene-methacrylate copolymers, ethylene/propylene-aromatic copolymers, ethylene/propylene-diene-acrylate copolymers, ethylene/propylene-diene-methacrylate copolymers, or combinations and/or fluorinated versions thereof).

The amount of the first fluid and the second fluid is not limited. In particular disclosed embodiments, the amount of the first fluid is an amount needed to prevent an amount or portion of the second fluid that becomes polymerized from contacting a surface of the first container component of the system. In some embodiments, the second fluid can be present in the first container in an amount (e.g., at a volume) greater than the amount of the first fluid. In yet other embodiments, the first fluid can be present in the first container in an amount (e.g., at a volume) greater than the second fluid. In yet additional embodiments, equal amounts of the first fluid and the second fluid can be used.

The fluid-fluid interface alone, as described above, affords many advantages to the additive manufacturing process, including but not limited to, avoiding the adhesion problems discussed. In some embodiments, an additional benefit is gained from circulating the first fluid, such as a solvent described herein, after the fluid has been treated with an inert gas. For example, in embodiments using a first fluid that is a solvent (e.g., a perfluorinated solvent), the fluid's affinity and capacity for dissolving oxygen can be used to draw oxygen from the second fluid that forms the fluid-fluid interface with the first fluid to thereby prevent deleterious effects that oxygen can cause during printing. This can be achieved by circulating the inert gas-treated first fluid through the system. In some embodiments, the fluid can be treated with the inert gas such that it is saturated with the inert gas. As the inert gas-treated fluid is circulated, oxygen is removed from the second fluid and replaced with the inert gas. This gas exchange provides deoxygenation of the second fluid and thus significantly limits the radical scavenging effects of oxygen at the processing surface. As a result, the layers undergo complete polymerization uniformly across the layer, which can be particularly beneficial when printing fine structures on a small scale. For example, if oxygen were not modified at all, printed features on a large or intermediate scale (e.g., 1 mm and 0.5-1.0 mm, respectively) will likely suffer from poorer resolution, whereas those printed on a small scale (e.g., 10-500 µm) may not print at all.

Generally, oxygen in a photo-curable printable resin can be useful in that it scavenges radicals outside of the processing surface, which prevents polymerization in a volume of the resin where polymerization is unwanted. For this purpose, in some embodiments, a polymerization quenching compound (e.g., TEMPO or the like) in the second fluid scavenges unwanted radicals thereby preventing further polymerization of those monomeric components having polymerized and/or begun to polymerize outside of the processing surface. In some embodiments, this activity can facilitate the systems and methods described herein to benefit from the radical scavenging effects typically provided by oxygen outside of the processing surface while significantly limiting the scavenging effects at the processing surface.

As described herein, system embodiments can comprise a first container capable of containing the first and second fluids (e.g., a first container as described above). In particular disclosed embodiments, the first container can be made of any type of material so long as the material making up the first container (or at least making up a portion of the first container) is sufficiently transparent. The transparent portion of the first container allows light from an energy source to pass through one or more surfaces of the first container such that it is able to reach the second fluid to thereby promote polymerization of the second fluid, or promote polymerization of a monomeric component present in the second fluid. In some embodiments, the first container can be made of glass, plastic, any other transparent material, or combinations thereof. In particular disclosed embodiments, the first container comprises a bottom that is transparent so as to allow light incident on the surface of the first container to enter the internal space of the first container. The bottom of the first container can comprise an inner surface and an outer surface. In some embodiments, the inner surface of the bottom of the first container can face the interior of the first container and can be in contact with the first fluid; and the outer surface of the bottom of the first container can face the exterior of the first container and can be exposed to light provided by an energy source used in a method to print a product from the second fluid.

In other embodiments, the inner surface of the bottom of the first container can face the interior of the first container and can be in contact with the second fluid and further can be exposed to light provided by an energy source positioned above the inner surface of the bottom of the first container. In some embodiments, the first container can be any suitable shape for housing a fluid, such as, but not limited to, cylindrical containers, rectangular containers, square containers, and any other geometrical shape. The first container has a size sufficient to contain an amount of the two fluids needed to print a desired product. The size and shape of first container to be used in the system can be selected by a person of ordinary skill in the art with the benefit of the present disclosure.

System embodiments of the present disclosure can also comprise a second container configured to treat a first fluid with an inert gas. Such embodiments can further comprise a first container comprising the fluid-fluid interface and through which the inert gas-treated first fluid can be circulated. Each of the first and second containers can comprise an inlet region and an outlet region fluidly coupled (which may also be decoupled) to the first and second conduits. The first and second conduits facilitate circulating the inert gas-treated first fluid through the first container housing the fluid-fluid interface and then delivering it to a second container. The first and second conduits can each comprise tubing having a lumen through which the first fluid can flow between the two containers. Suitable tubing can include chemical, industrial, and/or medical grade tubing. The first conduit can be defined by tubing extending from the second container to the first container and the second conduit can be defined by tubing extending from the first container to the second container. In some embodiments, the tubing can be a flexible Tygon® tubing and/or any other suitable flexible polymer tubing (e.g., silicone, PVC, fluoropolymer, thermoplastic, etc.), including those resistant to oxygen and/or prevents oxygen from entering the inner lumen of the tubing.

Figure 6A:
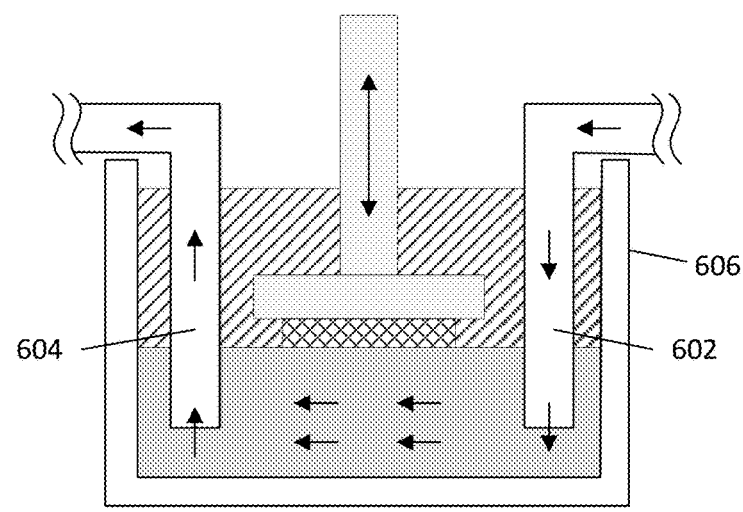
FIGS. 6A-6C are schematic illustrations of three different system configurations in which the first and second conduits can be fluidly coupled to a first container of a representative system embodiment.
Figure 6B:
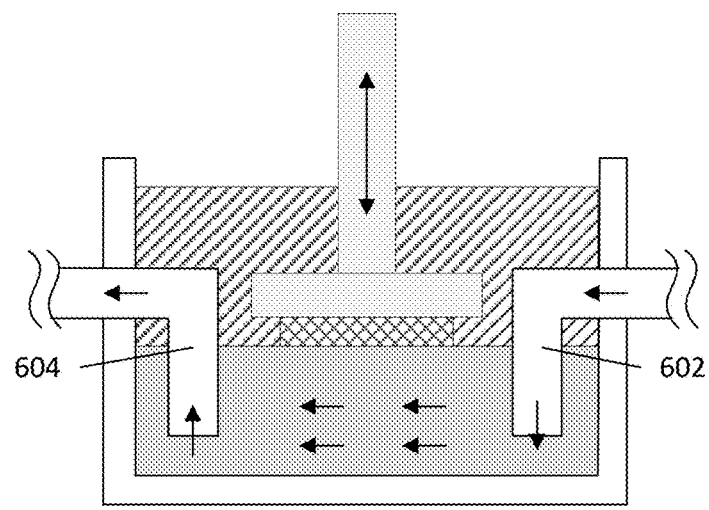
Figure 6C:
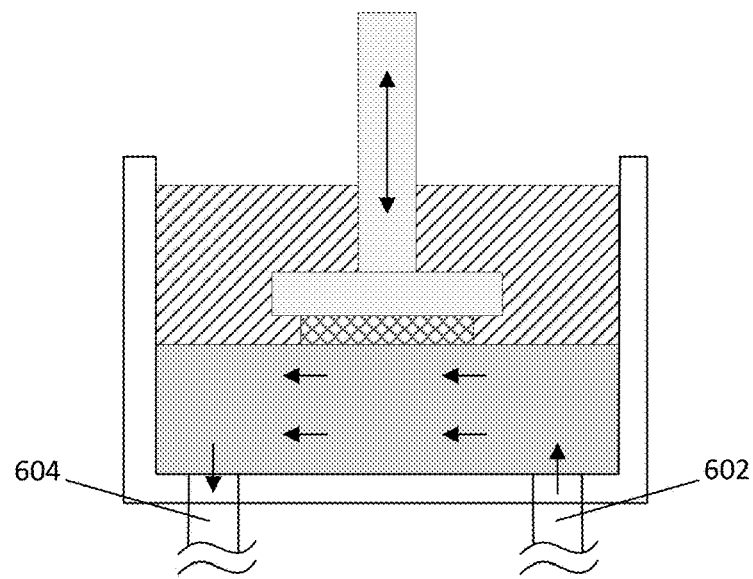

In some embodiments, the first and second containers each have an inlet and outlet region configured to receive respective conduits for circulation. For instance, and merely as an example, the first conduit can comprise four outlet regions (e.g., four outlets diverging from a single central lumen) fluidly coupled to four inlet regions (e.g. ports) of the first container. As such, an inlet region and/or outlet region can comprise of a plurality of inlet regions and/or outlet regions, respectively. Alternatively, the first and second conduits may comprise a plurality of individual tubes fluidly coupled to the first and second containers. The first and second conduits can be coupled to the first container by extending over the top of the first container (and possibly through resin), through a side of the first container, and/or at a bottom portion of the first container. FIGS. 6A, 6B, and 6C illustrate different conduit arrangements that can be used in disclosed system embodiments. With reference to FIGS. 6A-6C, first and second conduits 602, 604 can be fluidly coupled to first container 606 by extending over the top of the first container (as illustrated in FIG. 6A), or through a side of the first container (as illustrated in FIG. 6B), and/or at a bottom portion of the first container 606 (as illustrated in FIG. 6C).

In some embodiments, the system can further comprise a pump mechanism at a point along the first and/or second conduits for moving fluid between the first and second containers. In some embodiments, the pump mechanism can comprise a peristaltic pump with multiple channels (or a plurality of individual pumps) to circulate the fluid through the system defined by the two containers and conduits therebetween. Accordingly, the first conduit, second conduit, pumping mechanism, and/or second container can be said to form a circulation system configured to circulate fluid between the first and second containers. In some embodiments, the system can be a closed system (that is, closed to external environmental surroundings) and circulating the first fluid in this closed system can facilitate reduced contamination of the first fluid as it can prevent the first fluid from interacting with any environment and/or components external to the system. The pump mechanism can also be selected from other pump mechanisms, such as a suitable displacement pump, direct lift pump, gravity pump and/or other pumps capable moving the first fluid through the system.

In particular embodiments, the second container can be made of a material selected from glass, plastic, and/or metal. In some embodiments, the second container is a column structure capable of holding a fluid. The second container can have any length and can be positioned vertically, horizontally, and/or other angles. The second container can also comprise and/or be coupled to a reservoir-type structure that houses a volume of the first fluid that is to be treated with the inert gas. Additionally, the second container can also contain, be coupled to, and/or extend into, an inert gas source configured to supply the inert gas to and along the second container. The inert gas can be any suitable gas source, including helium, argon, nitrogen, carbon dioxide, or the like, including any combinations thereof. The second container can also comprise a porous element positioned at a location along its length (e.g., at a location along the length of the column). In some embodiments, the porous element can comprise a glass, metal, ceramic, and/or plastic porous material. In particular embodiments, the porous element can be a porous frit, straw, pipette, and/or any other appropriate porous structure or material. The porous structure can diffuse and/or cause the inert gas supplied to the second container to be dispersed into bubbles such that the bubbles of the inert gas permeate the first fluid and displace oxygen and/or other unwanted gas by way of increasing the area of the gas-liquid interface to encourage the dissolved gas to escape the first fluid (e.g., in accordance with Henry's law).

In some embodiments, the system can further comprise an overflow region, which can be fluidly coupled to the second container to capture an overflow of the first fluid in its various phases (e.g., evaporated, liquid, or gaseous state) as it is bubbled with the inert gas. The overflow region can be coupled to the second container by any suitable tubing (such as that discussed herein) and/or fluid-coupling mechanism that forms a first pathway from the second container to the overflow region. The overflow region can also comprise a reservoir to capture any overflowing fluid, which in turn can further comprise a fluidly coupled tube/pathway that reintroduces fluid back into the system. The fluid can be reintroduced back into the second container, the first container, the first conduit, and/or the second conduit.

The first fluid, once adequately treated with the inert gas at the second container, can be pumped through the first conduit coupled to the outlet region of the second container and to the inlet region of the first container. The first fluid can be moved by one or more pump mechanisms and/or any suitable pumps as described herein.

Figure 7:
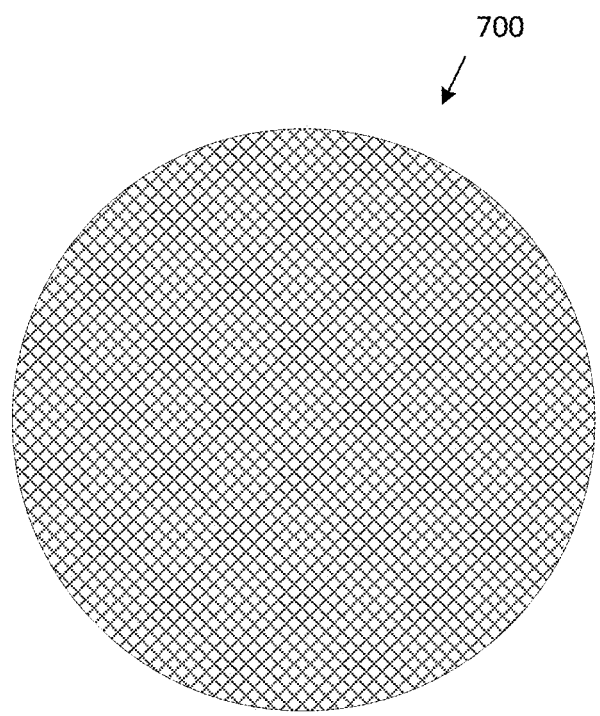
FIG. 7 is a view of a fluid-permeable screen that can be included in disclosed system embodiments.

In some embodiments, the inlet region of the first container can include a baffle covering a surface area of the inlet region that can diffuse (or disperse) the first fluid and remove unwanted air from the first fluid as it flows into the first container. The baffle can be fluid permeable and can be made of any suitable material, such as metal, plastic, glass, etc. or combinations thereof. The baffle comprises openings, which can have any size and shape, that are positioned along the surface of the baffle to accomplish the desired diffusion and removal of unwanted air. The baffle can remove unwanted resin from the first fluid and/or can facilitate flow of the first fluid into the first container. FIG. 7 provides an illustration of a representative fluid-permeable baffle 700, which can be included in the inlet region of the first container and/or within the lumen of the tubing. Baffle 700 can be used to remove (or disperse) air from (or within) the first fluid (e.g., the treated first fluid), disperse the first fluid itself (e.g., to help control the flow rate), and/or can act to baffle unwanted contaminants (e.g., resin or polymerized material within the first fluid). The openings along the surface of the baffle can be any shape and/or size and in any number for differing degrees of permeability.

In some embodiments, the pumping mechanism along the first and/or second conduits (e.g., conduits of the circulation system) that drive the first fluid through the system can induce a current of the first fluid as it flows from the inlet region of the first container to the outlet region of the first container. This current of the first fluid through the first container is caused by way of the driving and pulling forces applied to the first fluid by the pumping mechanism. In addition, the pumping mechanism can control the flow rate of the first fluid entering the inlet region of the first container and the flow rate of the first fluid exiting the outlet region of the first container.

In some embodiments, the outlet region of the second container can be adjustable and/or stationary at a predetermined height to passively control the volume and/or flow rate of the first fluid entering the first container housing the fluid-fluid interface. Additionally, the outlet region at a predetermined height can be used in conjunction with the pumping mechanism to more actively control the volume (and/or rate) of the first fluid entering the first container.

Controlling the flow rate of the first fluid can ensure that there is no unnecessary force applied to the processing surface (e.g., at the fluid-fluid interface) by the current of the first fluid, thereby avoiding damage to a printed layer and/or disruption or mixing with the resin. In some embodiments, the flow rate of the first fluid entering the first container can be proportional to the surface area of the first container and/or surface area of the second fluid. For example, the surface area of the second fluid exposed to the atmosphere determines the rate at which oxygen is diffused into the second fluid and is generally proportional (or equal) to the surface area of the fluid-fluid interface housed in the first container. As the surface area of the second fluid increases or decreases, so too does the diffusion of oxygen from the atmosphere into the second fluid. As a result, to achieve the proper modification of the oxygen in the second fluid, the flow rate of the first fluid can be increased or decreased as the surface area of the second fluid and/or first container is increased or decreased, respectively.

In further embodiments, the flow rate of the first fluid can be scaled linearly. For example, in some embodiments, the total first flow rate can be 150 mL/minute to 30 mL/minute, such as 200 mL/minute to 250 mL/minute for a processing surface of 17×17 cm. From these parameters, the rate can be scaled linearly to prevent damage to the processing surface and provide adequate deoxygenation as the printing surface is increased or decreased.

In some embodiments, the depth of the first fluid (e.g., a volume of the first fluid) within the first container can affect the relative flow rate of the first fluid needed for adequate deoxygenation. For example, in some embodiments where a higher volume of the first fluid is used; the fluid flow rate can be increased. In other embodiments where a lower volume is used, the fluid flow rate can be reduced. For example, the flow rate can be 50 mL/min to 200 mL/min for a volume of 50 mL to 250 mL of the first fluid in the first container. Whereas, for a volume of 25 mL to 75 mL of the first fluid in the first container, the flow rate can be 25 mL/min to 100 mL/min. Both the fluid flow rate and depth of the first fluid can also be altered as appropriate to the benefit of the present disclosure.

Additionally, the flow rate of the first fluid can be controlled or altered by adjusting the diameter of the first conduit along some portion of its length. For example, the cross-sectional diameter of the first conduit can either narrow or widen to control the fluid flow rate of the first fluid. For example, a region along the length of the first conduit can have a diameter that is larger relative to other regions along the first conduit, such as regions that are associated with the inlet region of the first container. In exemplary embodiments, the first conduit can comprise a region having a cross-sectional diameter of 0.5 inches and a region having a smaller diameter of 0.125 inches, with the region having the smaller diameter being positioned at (or near) the inlet region of the first container to restrict (or slow) the fluid flow rate into the first container. Similar configurations can be used for conduits extending from the outlet region of the first container and/or the inlet and outlet regions of the second container.

In particular embodiments, the outlet region of the first container can be located below the fluid-fluid interface and fluidly coupled to the second conduit extending from the first container to the inlet region of the second container. With the outlet region of the first container located below the fluid-fluid interface, the likelihood of resin unnecessarily mixing and being transported with the first fluid as the first fluid flows from the outlet region of the first container to the second container can be reduced. Additionally, with the outlet region being positioned below the fluid-fluid interface, the volume of the first fluid used to form the fluid-fluid interface can be shallower (or have a lower volume). As such, the flow rate of the first fluid into and through the first container can be altered relative the fluid flow rate needed if a larger volume is used, as described herein.

Alternatively, the outlet region can be positioned to extend through the resin from above and/or from a side of the first container and into the first fluid. As discussed above, the second conduit fluidly coupled to the outlet region of the first container can have differing diameters along some portion of the length to restrict the second flow rate of the first fluid exiting the first container with or without the one or more pumping mechanisms.

In some embodiments, as the first fluid enters the second container, the inert gas is again bubbled into the first fluid where the first fluid will ultimately be circulated again through the first container. In further embodiments, the second container can comprise and/or be coupled to a heating and/or cooling apparatus to control the temperature of the first fluid. By having the ability control the temperature of the first fluid, the system described herein is able to utilize or adapt to fluids that may physically and/or chemically respond to heated or cooled conditions.

As discussed herein, embodiments of the system can be combined with additional components to facilitate printing methods. Additional components can include an energy source, an actuator, a printing platform, and any combination thereof. Suitable energy sources that can be used with the system embodiments of the present disclosure can be any energy source capable of producing energy, such as light and/or heat. In particular embodiments, the energy source produces energy having a wavelength (e.g., of ultraviolet light) that promotes polymerizing the second fluid (or of a monomeric component present therein). In some embodiments, the energy sources can be a laser (of possible varying wavelengths), an LED, an ion beam, an electron beam, or another source of radiation (e.g., electromagnetic radiation), including any combinations thereof. Such lasers and others are recognizable to those of ordinary skill in the art with the benefit of the present disclosure.

The actuator (and corresponding components coupled thereto) can be a motor capable of moving in vertical directions and can be controlled in terms of speed by which it is moved up and/or down during a printing process. The actuator can be mechanically coupled (e.g., by a shaft, arm, etc.) to a printing platform which facilitates the location and building of the printed part during the printing/polymerization process. Suitable actuators and printing platforms are recognizable to those of ordinary skill in the art with the benefit of the present disclosure.

Figure 8:
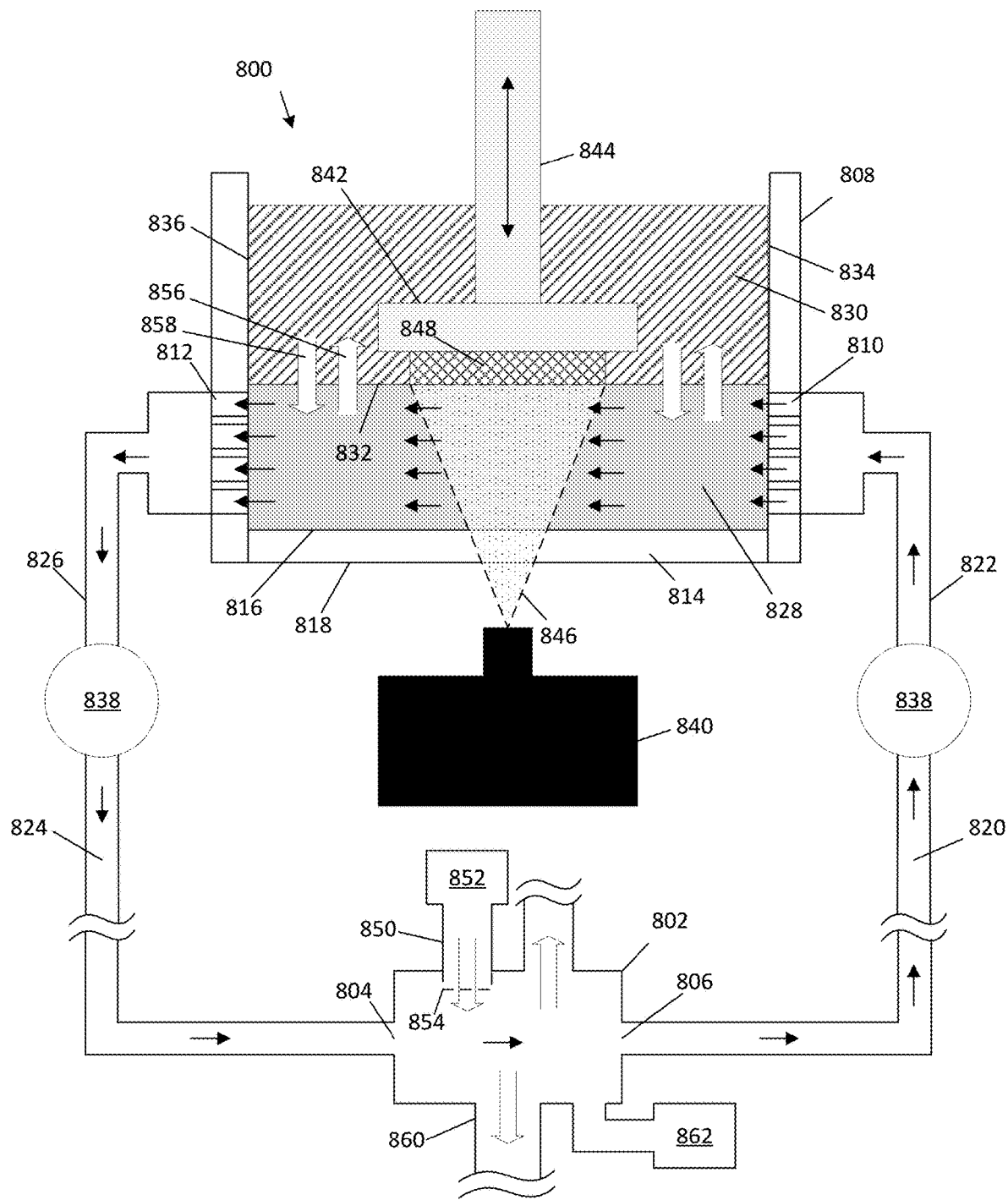
FIG. 8 is a second schematic illustration of a system embodiment according to the present disclosure.

FIG. 8 illustrates a representative system embodiment, system 800, which comprises second container 802 (e.g., a column with a reservoir) having inlet region 804 and outlet region 806; and first container 808 (e.g., a vat) having inlet region 810, outlet region 812, and transparent portion 814 with inner surface 816 and outer surface 818. The representative system of FIG. 8 can also include first conduit 820 for conveying a fluid and formed by first tube 822, which is fluidly coupled to outlet region 806 of second container 802 and inlet region 810 of first container 808; and second conduit 824 for conveying a fluid and formed by second tube 826, which is fluidly coupled to outlet region 812 of first container 808 and inlet region 804 of second container 802.

System 800 of FIG. 8 can also include first fluid 828 (e.g., a solvent) and second fluid 830 (e.g., a printable resin) which form fluid-fluid interface 832 within the first container 808 extending from a first side (e.g., side 834) to a second side (e.g., side 836) of the first container. First fluid 828 contacts inner surface 816 of transparent portion 814 of first container 808. Pumping mechanism 838 can also be configured to circulate first fluid 828 through the system such that first fluid 828 flows between fluid-fluid interface 832 and inner surface 816 of transparent portion 814 of first container 808. Additionally, inlet region 810 and/or tube 822 can include baffle 864 (not illustrated) to assist in dispersing first fluid 828 as it flows into first container 808.

Additional components that can be associated with the system are also illustrated in FIG. 8. For example, system 800 further comprises energy source 840, printing platform 842, and actuator apparatus 844. Energy source 840 can provide energy 846 in the form of photons (e.g., light) and/or other forms of energy incident on transparent portion 814 of first container 808 such that energy 846 is incident on fluid-fluid interface 832. Energy 846 induces polymerization of second fluid 830 (or a monomeric component contained therein) so as to form printed object 848 at fluid-fluid interface 832. As first fluid 828 is transparent (or at least semitransparent), it allows energy 846 to pass through to fluid-fluid interface 832.

With further reference to FIG. 8, a portion of printed object 848 is physically associated with printing platform 842, which is coupled to actuator apparatus 844. Actuator apparatus 844 orients printing platform 842 in the desired positioning to print, layer by layer, printed object 848. Further, second container 802 of FIG. 8 can also include column 850 (e.g., or channel like structure) to direct an inert gas from inert gas source 852 (e.g., which can be positioned within and/or coupled to second container 802) through porous element 854 and into first fluid 828 so as to form inert gas-treated fluid. second container 802 can include overflow region 860, which can capture overflow of first fluid 828 as the diffusion process occurs. Additionally, second container 802 can also include and/or be coupled to heating (and/or cooling) apparatus 862 to control a temperature of first fluid 828.

Method Embodiments

Disclosed herein are embodiments of a method comprising using a fluid-fluid interface and gas transport system in an additive manufacturing process (e.g., a photopolymerization additive manufacturing process, such as DLP, CDLP, and/or SLP).

In particular disclosed embodiments, the method comprises circulating a first fluid and polymerizing a second fluid (or a monomeric component contained therein) at the fluid-fluid interface, which is formed by the first fluid and the second fluid as described herein. In some embodiments, the method comprises printing a part using a fluid-fluid interface formed by a system embodiment of the present disclosure. In some embodiments, the method comprises adding a first fluid and a second fluid to a first container, exposing the container to an energy source such that light (or other type of energy) passes through a surface of the first container to the second fluid, which is a monomeric precursor to a polymer or contains a monomer precursor to a polymer.

In particular embodiments, the first fluid is treated with an inert gas and circulated through the container housing the fluid-fluid interface. In other particular embodiments, the first fluid is treated with an inert gas in another container (e.g., a second container) and then circulated through the system while the second fluid is exposed to polymerization conditions. In particular embodiments, the inert gas-treated fluid is circulated through the first container thereby displacing oxygen present in the second fluid. In yet additional embodiments, the volume and/or flow rate of the inert gas-treated fluid is controlled as it enters and exits the container housing the fluid-fluid interface.

The method can further comprise moving, in a vertical direction, an actuator that is mechanically coupled to a printing platform. The actuator and/or the printing platform typically are positioned within the container and immersed in the second fluid. As the actuator is moved in a vertical direction (e.g., up and/or down), polymerization of the second fluid (or a monomeric component contained therein) takes place in locations where light from the energy source is focused, which forms a printed part either by printing individual layers of polymer on one another or in a continuous process.

The representative system of FIG. 8 illustrates that as inert gas-treated fluid 828 is circulated through first container 808, inert gas 856 within the inert gas-treated fluid 828 replaces the oxygen 858 within the second fluid 830 such as to provide consistent deoxygenation of the second fluid 830 (e.g., photopolymer/printable resin). The deoxygenation of the second fluid 830 acts to counteract the diffusion of oxygen 858 at the fluid-fluid interface 832 which ultimately effects the layers of the polymerized object 848.

In particular disclosed method embodiments, resolution and integrity of printed parts is not compromised by the mechanical limitations of conventional methods. For example, a fine printed fiber that would normally fail to fully polymerize during processing and/or tear during a peeling step of a DLP method conducted without the disclosed system, can be printed using the system and method embodiments disclosed herein. Similarly, dilute polymer gels (e.g., aerogel precursors) are very difficult to print using systems without a fluid-fluid interface when each layer must be detached from a solid-solid interface, such as in a non-fluid-fluid interface process. In such instances, as the part is built upwards, the gel is subject to axial strain as it is elastic, itself, which results in a gel that is stretched over and over, and either rips apart or is not homogenous in its structure. Additionally, those ultra-fine, small scale objects with complex inner structures, such as those lattice structures discussed, are rid of the critical problem of gas diffusion during polymerization, which hinders high resolution and structural soundness. Because system and method embodiments of the present disclosure utilize a fluid-fluid interface and gas transport, any such problems can be avoided in parts printed using such system and method embodiments.

Example 1

As described herein, a variety of fine structures, including fine lattice structures, can be printed in high resolution using the fluid-fluid interface and gas transport system of the present disclosure. Such fine structures can be achieved by modifying the levels of oxygen in a photo-curable printable resin and printing the structure at a fluid-fluid interface formed by the printable resin and an inert gas-treated solvent circulated through the system. The printed lattice structures of FIG. 3 and region 400 of FIG. 4 are illustrative of such structures.

Referring to the lattice structure of FIG. 3, in this example, the lattice structure was a printed on a layer of nitrogen-saturated FLUORINERT® circulated at a rate of 50 mL per minute through the vat containing the fluid-fluid interface formed by the nitrogen-treated FLUORINERT® and the photo-curable composition. Each layer of the structure had a layer height of 100 microns and an exposure time in a range of 7-30 seconds.

The photo-curable resin used in printing the lattice structure included 115 mL of trimethylolpropane ethoxylate triacrylate (or "TET"), 50 mL acrylic acid, 200 mL of water, and 50 mL of dimethylformamide (or "DMF"). The resin further comprised 700 mg Irgacure® 2500, 20 mg of 2,2,6,6-tetramethylpiperidine 1-oxyl (or "TEMPO"), and 150 mg of the azo-containing dye Sudan I.

In view of the many possible embodiments to which the principles of the present disclosure may be applied, it should be recognized that the illustrated embodiments are only preferred examples and should not be taken as limiting the scope of the present disclosure. Rather, the scope of the present disclosure is defined by the following claims. We therefore claim as our invention all that comes within the scope and spirit of these claims.

Overview of Several Embodiments

Disclosed herein are embodiments of a system for additive manufacturing, the system comprising: a first container comprising a transparent portion having an inner surface and outer surface; and a first fluid and a second fluid forming a fluid-fluid interface within the first container, wherein the first fluid is between the fluid-fluid interface and the transparent portion and wherein the first fluid is configured to remove oxygen from the second fluid at the fluid-fluid interface to facilitate polymerization of a monomeric component in the second fluid.

In some embodiments, the first fluid is treated with an inert gas.

In any or all of the above embodiments, the second fluid comprises a monomeric component capable of being polymerized, an initiator, a polymerization quenching compound, a solvent, or any combination thereof.

In any or all of the above embodiments, the first fluid has a density greater than a density of the second fluid.

In any or all of the above embodiments, the inert gas is nitrogen, helium, argon, carbon dioxide, or any combination thereof.

In any or all of the above embodiments, the first fluid is a perfluorinated solvent and the second fluid is a photopolymer resin capable of photopolymerization, wherein the first fluid is insoluble in the second fluid.

In any or all of the above embodiments, the system further comprises a circulation system configured to circulate the first fluid through the first container such that the first fluid flows between the fluid-fluid interface and the inner surface of the transparent portion of the first container.

In any or all of the above embodiments, the first container further comprises an inlet region and an outlet region; and the circulation system comprises a second container having an inlet region and an outlet region; a first conduit for conveying the first fluid, the first conduit coupled to the outlet region of the first container and the inlet region of the first container; and a second conduit for conveying the first fluid, the second conduit coupled to the outlet region of the first container and the inlet region of the second container.

In any or all of the above embodiments, the circulation system comprises a pumping mechanism configured to circulate the first fluid through the second container, the first conduit, the first container, and the second conduit, such that the first fluid flows from the inlet region of the first container to the outlet region of the first container.

In any or all of the above embodiments, the system further comprises a porous element positioned within the second container, wherein the second container is configured to receive an inert gas source configured to drive the inert gas through the porous element and into the first fluid within the second container such that the inert gas is dispersed within the first fluid.

In any or all of the above embodiments, the system further comprises an energy source positioned directly or indirectly adjacent to the outer surface of the first container and configured to project energy incident on the outer surface of the transparent portion of the first container such that the energy is incident on the fluid-fluid interface.

In any or all of the above embodiments, the system further comprises a printing platform and an actuator, wherein the printing platform is coupled to the actuator and is configured to be immersed in the second fluid, wherein the actuator is configured to alter an orientation of the printing platform within the second fluid.

In any or all of the above embodiments, the first tube or the inlet region of the first container comprises a baffle that is fluid permeable and configured to disperse the first fluid and unwanted oxygen from the first fluid as it flows into the first container.

In any or all of the above embodiments, wherein the outlet region of the first container is positioned below the fluid-fluid interface.

Disclosed herein are additional embodiments of a system for additive manufacturing, the system comprising: a first fluid treated with an inert gas; a second fluid comprising a monomeric component capable of polymerization; a container comprising a transparent portion having an inner surface and an outer surface, wherein the first fluid and the second fluid are contained within the container such that the first fluid and second fluid form a fluid-fluid interface within the container, wherein the first fluid is between the inner surface of the transparent portion and the second fluid, wherein the first fluid removes oxygen at the fluid-fluid interface from the second fluid and releases the inert gas into the second fluid; and a circulation system configured to circulate the first fluid through the container such that the first fluid flows between the fluid-fluid interface and the inner surface of the transparent portion of the container.

In some embodiments, the container further comprises an inlet region and an outlet region, and the circulation system is configured to control a first flow rate of the first fluid as it enters the container and a second flow rate of the first fluid as it exits the container, wherein the first fluid flows from the inlet region to the outlet region of the container and between the inner surface of the container and the fluid-fluid interface.

In any or all of the above embodiments, the first flow rate of the first fluid is greater than the second flow rate of the first fluid.

In any or all of the above embodiments, the first flow rate of the first fluid is linearly proportional to a printing surface area of the system.

Also disclosed herein is a further embodiment of a system for additive manufacturing, the system comprising: a vat having an inlet region, an outlet region, and a transparent portion with an inner surface and an outer surface; a first conduit for conveying a fluid to the vat coupled to the inlet region of the vat; a second conduit for conveying the fluid from the vat coupled to the outlet region of the vat; the fluid and a photopolymer resin capable of photopolymerization, wherein the fluid and the photopolymer resin form a fluid-fluid interface within the vat, wherein the fluid is treated with an inert gas and is between the inner surface of the transparent portion of the vat and the photopolymer resin, and wherein gasses diffuse at the fluid-fluid interface between the fluid and the photopolymer resin to remove oxygen from the photopolymer resin and into the fluid; a pump configured to circulate the fluid through the first conduit, the vat, and the second conduit, such that the fluid flows between the fluid-fluid interface and the inner surface of the transparent portion of the vat, and from the inlet region of the vat to the outlet region of the vat; a light source positioned directly or indirectly adjacent to the outer surface of the vat and configured to project light incident on the outer surface of the transparent portion of the vat such that the light is incident on the fluid-fluid interface; and a printing platform and an actuator, wherein the printing platform is coupled to the actuator and is configured to be immersed in the photopolymer resin, wherein the actuator is configured to alter an orientation of the printing platform within the photopolymer resin.

Disclosed herein are further embodiments of a system for additive manufacturing, the system comprising: a first container having an inlet region, an outlet region, and a transparent portion with an inner surface and an outer surface; a second container having an inlet region and an outlet region; a first conduit for conveying fluid, formed by a first tube fluidly coupled to the outlet region of the second container and the inlet region of the first container; a second conduit for conveying fluid, formed by a second tube fluidly coupled to the outlet region of the first container and the inlet region of the second container; a first fluid and a second fluid forming a fluid-fluid interface within the first container extending from a first side to a second side of the first container, wherein the first fluid is treated with an inert gas and is in contact with the inner surface of the transparent portion of the first container; and a pumping mechanism configured to circulate the first fluid through the second container, the first conduit, the first container, and the second conduit, such that the first fluid flows between the fluid-fluid interface and the inner surface of the transparent portion of the first container, and from the inlet region of the first container to the outlet region of the first container.

In some embodiments, the second fluid comprises a monomeric component capable of being polymerized, an initiator, a polymerization quenching compound, a solvent, or any combination thereof.

In any or all of the above embodiments, the first fluid has a density greater than a density of the second fluid.

In any or all of the above embodiments, the system further comprises a porous element positioned within the second container, wherein the second container is configured to receive an inert gas source configured to drive the inert gas through the porous element and into the first fluid within the second container such that the inert gas is dispersed within the first fluid.

In any or all of the above embodiments, the inert gas is nitrogen, helium, argon, carbon dioxide, or any combination thereof.

In any or all of the above embodiments, the first tube comprises a plurality of lumens.

In any or all of the above embodiments, the second tube comprises a plurality of lumens.

In any or all of the above embodiments, the first fluid is a perfluorinated solvent and the second fluid is a photopolymer resin capable of photopolymerization, wherein the first fluid is insoluble in the second fluid.

In any or all of the above embodiments, the system further comprises an energy source positioned directly or indirectly adjacent to the outer surface of the first container and configured to project energy incident on the outer surface of the transparent portion of the first container such that the energy is incident on the fluid-fluid interface.

In any or all of the above embodiments, the system further comprises a printing platform and an actuator, wherein the printing platform is coupled to the actuator and is configured to be immersed in the second fluid, wherein the actuator is configured to alter an orientation of the printing platform within the second fluid.

In any or all of the above embodiments, the first tube or the inlet region of the first container comprises a baffle that is fluid permeable.

In any or all of the above embodiments, the system further comprises an overflow region, wherein the overflow region is coupled to the second container and positioned to capture an overflow of the first fluid in the second container.

In any or all of the above embodiments, the outlet region of the first container is positioned below the fluid-fluid interface.

Also described herein are embodiments of a method for printing an object, the method comprising: treating a first fluid in a second container with an inert gas to form an inert gas-treated fluid; feeding the inert gas-treated fluid from the second container to an inlet region of a first container; controlling a first flow rate of the inert gas-treated fluid as it flows into the inlet region of the first container, wherein the inert gas-treated fluid flows from the inlet region to an outlet region of the first container and between an inner surface of the first container and a fluid-fluid interface extending from a first side to a second side of the first container and formed by the inert gas-treated fluid and a second fluid; controlling a second flow rate of the first fluid as it flows from the outlet region of the first container; and projecting energy from the energy source on the fluid-fluid interface.

In some embodiments, the first flow rate of the inert gas-treated fluid is greater than the second flow rate of the inert gas-treated fluid.

In any or all of the above embodiments, the first flow rate of the inert gas-treated fluid is linearly proportional to a printing surface area of the printing platform.

In any or all of the above embodiments, the first flow rate of the inert gas-treated fluid increases as a volume of the inert gas-treated fluid within the first container increases.

In any or all of the above embodiments, the first flow rate of the inert gas-treated fluid decreases as the volume of the inert gas-treated fluid within the first container decreases.

In any or all of the above embodiments, the method further comprises polymerizing layer-by-layer the second fluid at the fluid-fluid interface as to form a polymerized object, wherein a first end portion of the polymerized object is coupled to the printing platform.

In any or all of the above embodiments, the method further comprises moving the printing platform in a direction perpendicular to and away from the fluid-fluid interface at a rate proportional with the step of polymerizing the second fluid.

In any or all of the above embodiments, the method further comprises regulating the total volume of the first fluid and/or the inert gas-treated fluid and variations thereof such that the total volume of the first fluid does not decrease.

Disclosed herein is a further embodiment of a system for additive manufacturing, the system comprising: a container having an inlet region and an outlet region; a vat having an inlet region, an outlet region, and a transparent portion with an inner surface and an outer surface; a first conduit for conveying fluid formed by a first plurality of tubes fluidly coupled to the outlet region of the second container and the inlet region of the first container; a second conduit for conveying fluid formed by a second plurality of tubes fluidly coupled to the outlet region of the first container and the inlet region of the second container; a perfluorinated solvent and a photopolymer resin capable of photopolymerization forming a fluid-fluid interface within the vat extending from a first side to a second side of the vat, wherein the perfluorinated solvent is treated with an inert gas and is in contact with the inner surface of the transparent portion of the vat; a peristaltic pump configured to circulate the perfluorinated solvent through the container, the first conduit, the vat, and the second conduit, such that the perfluorinated solvent flows between the fluid-fluid interface and the inner surface of the transparent portion of the vat, and from the inlet region of the vat to the outlet region of the vat; a light source positioned directly or indirectly adjacent to the outer surface of the vat and configured to project light incident on the outer surface of the transparent portion of the vat such that the light is incident on the fluid-fluid interface; and a printing platform and an actuator, wherein the printing platform is coupled to the actuator and is configured to be immersed in the photopolymer resin, wherein the actuator is configured to alter an orientation of the printing platform within the photopolymer resin.

We claim:

1. A system for additive manufacturing, the system comprising:
   a first container comprising a transparent portion having an inner surface and outer surface; and
   a first fluid and a second fluid forming a fluid-fluid interface within the first container, wherein the first fluid is between the fluid-fluid interface and the transparent portion and wherein the first fluid is treated with an inert gas to remove oxygen from the second fluid at the fluid-fluid interface to facilitate polymerization of a monomeric component in the second fluid.

2. The system of claim 1, wherein the second fluid comprises a monomeric component capable of being polymerized, an initiator, a polymerization quenching compound, a solvent, or any combination thereof.

3. The system of claim 1, wherein the first fluid has a density greater than a density of the second fluid.

4. The system of claim 1, wherein the inert gas is nitrogen, helium, argon, carbon dioxide, or any combination thereof.

5. The system of claim 1, wherein the first fluid is a perfluorinated solvent and the second fluid is a photopolymer resin capable of photopolymerization, wherein the first fluid is insoluble in the second fluid.

6. The system of claim 1, further comprising a circulation system configured to circulate the first fluid through the first container such that the first fluid flows between the fluid-fluid interface and the inner surface of the transparent portion of the first container.

7. The system of claim 6, wherein the first container further comprises an inlet region and an outlet region; and the circulation system comprises a second container having an inlet region and an outlet region;
a first conduit for conveying the first fluid, the first conduit coupled to the outlet region of the first container and the inlet region of the first container; and
a second conduit for conveying the first fluid, the second conduit coupled to the outlet region of the first container and the inlet region of the second container.

8. The system of claim 7, wherein the circulation system comprises a pumping mechanism configured to circulate the first fluid through the second container, the first conduit, the first container, and the second conduit, such that the first fluid flows from the inlet region of the first container to the outlet region of the first container.

9. The system of claim 7, further comprising a porous element positioned within the second container, wherein the second container is configured to receive an inert gas source configured to drive the inert gas through the porous element and into the first fluid within the second container such that the inert gas is dispersed within the first fluid.

10. The system of claim 1, further comprising an energy source that projects energy incident on the outer surface of the transparent portion of the first container such that the energy is incident on the fluid-fluid interface.

11. The system of claim 1, further comprising a printing platform and an actuator, wherein the printing platform is coupled to the actuator and is configured to be immersed in the second fluid, wherein the actuator is configured to alter an orientation of the printing platform within the second fluid.

12. The system of claim 7, wherein the first conduit or the inlet region of the first container comprises a baffle that is fluid permeable and configured to disperse the first fluid and unwanted oxygen from the first fluid as it flows into the first container.

13. The system of claim 7, wherein the outlet region of the first container is positioned below the fluid-fluid interface.

14. A system for additive manufacturing, the system comprising:
a first fluid treated with an inert gas;
a second fluid comprising a monomeric component capable of polymerization;
a container comprising a transparent portion having an inner surface and an outer surface, wherein the first fluid and the second fluid are contained within the container such that the first fluid and second fluid form a fluid-fluid interface within the container, wherein the first fluid is between the inner surface of the transparent portion and the second fluid, wherein the first fluid removes oxygen at the fluid-fluid interface from the second fluid and releases the inert gas into the second fluid; and
a circulation system configured to circulate the first fluid through the container such that the first fluid flows between the fluid-fluid interface and the inner surface of the transparent portion of the container.

15. The system of claim 14, wherein the container further comprises an inlet region and an outlet region, and the circulation system is configured to control a first flow rate of the first fluid as it enters the container and a second flow rate of the first fluid as it exits the container, wherein the first fluid flows from the inlet region to the outlet region of the container and between the inner surface of the container and the fluid-fluid interface.

16. The system of claim 15, wherein the first flow rate of the first fluid is greater than the second flow rate of the first fluid.

17. The system of claim 15, wherein the first flow rate of the first fluid is linearly proportional to a printing surface area of the system.

18. A system for additive manufacturing, the system comprising:
a vat having an inlet region, an outlet region, and a transparent portion with an inner surface and an outer surface;
a first conduit for conveying a fluid to the vat coupled to the inlet region of the vat;
a second conduit for conveying the fluid from the vat coupled to the outlet region of the vat;
the fluid and a photopolymer resin capable of photopolymerization, wherein the fluid and the photopolymer resin form a fluid-fluid interface within the vat, wherein the fluid is treated with an inert gas and is between the inner surface of the transparent portion of the vat and the photopolymer resin, and wherein gasses diffuse at the fluid-fluid interface between the fluid and the photopolymer resin to remove oxygen from the photopolymer resin and into the fluid;
a pump configured to circulate the fluid through the first conduit, the vat, and the second conduit, such that the fluid flows between the fluid-fluid interface and the inner surface of the transparent portion of the vat, and from the inlet region of the vat to the outlet region of the vat;
a light source positioned directly or indirectly adjacent to the outer surface of the vat and configured to project light incident on the outer surface of the transparent portion of the vat such that the light is incident on the fluid-fluid interface; and
a printing platform and an actuator, wherein the printing platform is coupled to the actuator and is configured to be immersed in the photopolymer resin, wherein the actuator is configured to alter an orientation of the printing platform within the photopolymer resin.

* * * * *